Figure 1:
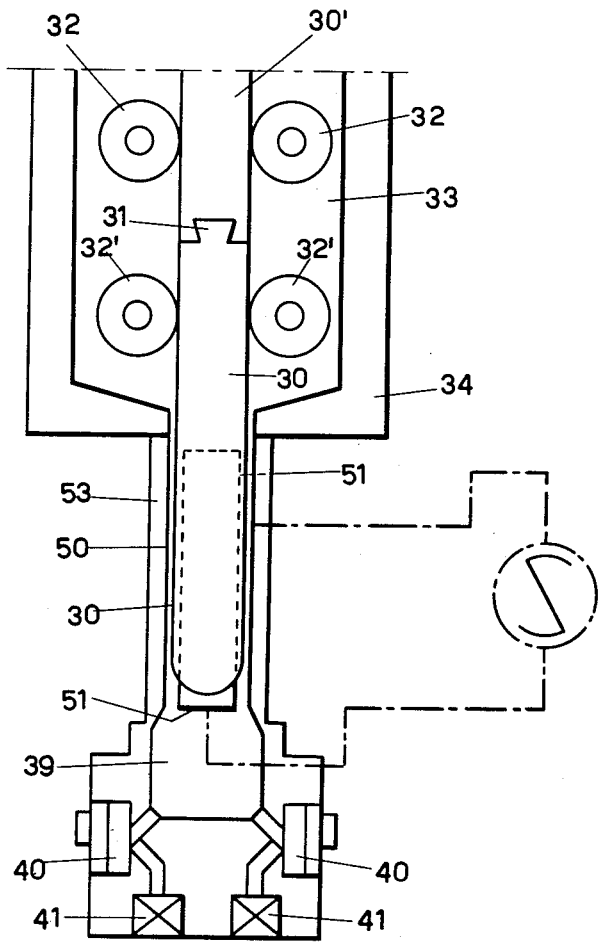

Nov. 27, 1956

E. LUZZATTO 2,771,634

APPARATUS FOR THE MELT-SPINNING
OF SYNTHETIC LINEAR POLYMERS

Filed June 30, 1952

INVENTOR.
E. Luzzato
BY
ATTYS.

United States Patent Office 2,771,634
Patented Nov. 27, 1956

2,771,634

APPARATUS FOR THE MELT-SPINNING OF SYNTHETIC LINEAR POLYMERS

Ettore Luzzatto, Milan, Italy, assignor to Perfogit Società per Azioni, Milan, Italy Application June 30, 1952, Serial No. 296,351

Claims priority, application Italy July 28, 1951

6 Claims. (Cl. 18—8)

This invention relates to an apparatus for the melt-spinning particularly of high molecular weight substances obtained by polymerization or polycondensation. The word "spinning" should be construed broadly to include the production not only of filaments but also of ribbons, films and other structures.

Spinnable high polymers when being melted pass through a softening range of temperature which may be broad or even extremely narrow so that a substantially sharp fusion occurs at a definite temperature. This invention will be carried into practice in different ways and with different results according to whether the polymer displays the first or the second mentioned behaviour.

Another important property sometimes found in high polymers is that of undergoing deterioration when exposed for a prolonged time to high temperatures in the molten state. This property is possessed by the several polymers to different degrees; and the deterioration may consist in a decomposition, a depolymerization, a harmful viscosity variation due to a change in the length of the molecular chains, and the like.

High polymers have been melt-spun hitherto by placing them in contact with a heated melting surface, suitably shaped to reduce their exposal to temperatures higher than the melting point. The use of radiant heat has been also proposed and other devices that concern the after-treatment of the molten polymer have been used. However none of the methods and apparatus proposed hitherto have proved wholly satisfactory, and in particular none reduce to a true minimum the temperatures to which the polymer is exposed and the duration of such exposal.

The present invention eliminates the melting surfaces and therewith all overheating and renders the melting rate independent of the extent of the polymer stock surface to which it has hitherto been bound even when radiant heat is used, by effecting at least a part of the heating required for melting by the method known as dielectric loss, or briefly, dielectric heating. The principles of this method are well known. It is applicable here inasmuch as the high polymers in question are dielectric materials and, with a few exceptions, have sufficiently high dielectric loss factors. Substantially, one can say that the material to be heated acts as the dielectric in a condenser inserted in a very high frequency oscillating circuit. Thus the heat is generated uniformly within the body of the dielectric, in this case, of the polymer to be melted. Thereby the said polymer stock may be imparted a substantially tubular configuration in which the surface/volume ratio is relatively low and high melting rates may be achieved in a compact apparatus embodying a tubular melting chamber matching the tubular solid polymer stock.

Preferably, the polymer is preheated by means other than dielectric heating to the vicinity or even practically within the softening range or to the vicinity of the melting point.

According to a preferred embodiment of the invention, the preheating and the heating of the polymer are so graduated that the polymer will reach the molten state only in the immediate vicinity of the spinneret, or, more precisely, of the spinning pump which controls the flow through said spinneret.

The melting of the polymer occurs while the same occupies a closed space wherein a certain pressure may be maintained, conveniently by means of the solid polymer itself, which space communicates with the spinning pumps.

According to another embodiment of the invention, the polymer undergoes a plastic deformation, generally very slight, immediately before melting.

Figure 2:
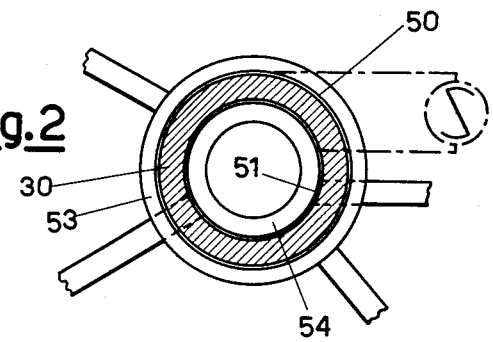

Figs. 1 and 2 schematically show an embodiment of the invention in vertical and horizontal cross-sections, respectively.

With reference to Figs. 1 and 2, solid polymer stock is in the form of thick tubes. In Fig. 1 two such tubes are indicated at 30 and 30' and their junction, which assures an uninterrupted feed, is indicated at 31 in an altogether schematic manner. Generally the tubes will be urged in the direction of feed by feed rollers, a particular arrangement of which has been indicated in the drawings; said arrangement however is not essential, indeed, in many cases it will be impossible to adopt. Here there are provided two pairs of rollers 32 and 32'. The first pair may be heated and have a non-smooth surface, for instance formed with very fine longitudinal projections. In this case such projections produce corresponding indentations in the surface of tube 30', and if rollers 32' have the same conformation they engage the indentations thus formed on the surface of the polymer tube and urge the same more firmly in the direction of feed.

It is to be noted that several tubes or files of tubes may be provided in parallel and in communication with the same melt chamber and may be fed thereto in part concurrently or successively; more generally, any suitable arrangement may be adopted to assure the desired continuity of the polymer stock feed. While being fed, the tubes may be enclosed in a preheating chamber 33 provided with a fluid circulation jacket 34 or other suitable heating means.

The tube 30 penetrates thereafter in the melting chamber. This is determined by two concentric metal tubes 50, 51 which constitute per se the condenser plates. The solid polymer stock tube fills the annular cavity. Polymer stock and plates have then in common a longitudinal axis of symmetry whereby the desired symmetric paths of lines of force and a uniform heating are assured. It is obvious that the length of the tubes 50, 51 acting as plates will be limited; they will be connected or merge at one end with the preheating chamber 33 and at the other with the molten polymer chamber hereinafter described. The plates per se will be maintained at a controlled temperature, which may be easily effected by providing the same with fluid circulation jackets, as schematically indicated at 53, 54. It is understood that, instead of only two plates, there may be provided several successive pairs of plates inserted in different circuits that may be separately controlled better to graduate the heating.

The viscosity of the molten polymer which tends to flow along tubes 50 and 51 in a direction opposite to the direction of feed and the fact that said polymer solidifies once again as soon as it leaves the most heated zone, suffices to keep all gases out of the melting chamber and to maintain therein the desired pressure, which may be very slight. In any case, as the polymer tube 30 proceeds between the tubular condenser plates, its temperature reaches the melting point. In the space 39 one has liquid polymer formed under a pressure that depends from the feeding speed of the polymer tube and the tightness of the seal between polymer tube 30 and condenser tubes 50 and 51. From space 39 the polymer is taken up by one or more measuring pumps 40 (of which two have been indicated in the drawing) which feed the spinnerets 41. All spinning organs proper are maintained at the desired temperature by any suitable means, and such temperature may rise as one proceeds towards the spinnerets.

The advantages of the invention are many, that is, not only one eliminates all heated melting surfaces, making it possible to achieve high productions with apparatus of minimum dimensions and reducing to a minimum the exposal of the polymer to high temperatures, but one obtains important specific advantages. Indeed here the passage of the polymer to the liquid state is followed almost immediately by its extrusion, that is, the time during which the polymer remains in the liquid state is reduced to a minimum that cannot be reached by any other method not employing heated surfaces, which latter are harmful for other reasons. Further, the polymer melts in a closed space where it cannot absorb gases of any nature and where no gaseous bubbles can be formed.

Further, the regulation of the apparatus is absolutely automatic. In fact, if it is determined that the liquid should be maintained in the space 39 at the pressure P, and if S is the cross-section of the solid polymer stock, it will be enough to maintain the same under a load $P \times S$ to be sure that it will constantly feed with a speed corresponding to the amount of polymer taken up by the spinning pumps and that the pressure of the liquid will remain constant. It will be sufficient then to make sure that enough heat is developed by dielectric loss, or, if important variations occur in the delivery of the spinning pumps, to vary to a corresponding extent the feeding of the oscillating circuit—a problem that persons skilled in the art can easily solve and on which it is unnecessary to insist. If necessary suitable means may be employed to effect a sufficiently tight seal between the polymer tube and condenser plate tubes, or the pressure may be allowed to remain very near to atmospheric pressure and this in many cases will be practically satisfactory. In the space 39 or at any suitable point of the apparatus, nets or filters will preferably be provided to guarantee that no solid particle or impurities that might be present reach the spinning pumps.

It may be useful to recall that the heat developed per unit of time by dielectric loss is given, in the case of a condenser with plane parallel plates, by the following formula:

$$C = 5.56 \times 10^{-13} \frac{F f U^2 \epsilon \, tg \, \delta}{d}$$

wherein C is given in watts, F is the surface of the plates in cm.$^2$, $f$ is the frequency, U the tension, $\epsilon$ the dielectric constant, $tg\delta$ the dielectric loss factor, and $d$ the distance between the plates in cm. To obtain the heat developed per unit of volume of the polymer, one must take into account the effective cross-section of the polymer stock, which may be less than $Fd$.

To give an approximate example, with reference to the case of Fig. 2, let us suppose that $f=20 \times 10^6$ cycles per second, and $U=1000$ v./cm. Let the polymer to be melted by a polyamide for which $\epsilon=5$, and $$tg\delta \times 10^4 = 500$$

and the heat of fusion=25 cal./cm$^3$. A simple calculation then shows that, in order to develop the entire heat of fusion by dielectric loss, the polymer should remain between the plates about 38 seconds. In practice this time should be somewhat longer since the preheating will not bring the polyamide exactly to its melting point but a little below it.

Of course, the preceding calculation has been made only for the sake of illustration and to show how one may simply obtain the data essential to the design of the apparatus. Indeed, once the time during which the polymer should remain between the plates has been determined, it is easy to calculate the speed of feeding based on the desired production and the cross-section of the stock.

In calculating the oscillating circuit, it is well to remember that in the present state of the art the frequency is generally comprised between 5 and 50 megacycles, and for middle powers 20-30 megacycles often is an advisable frequency range. For small powers however higher frequencies, such as 100 or even 200 megacycles, may be used. As to the tension, in applications of this nature it is generally preferable to keep below 1 kv. per cm. of distance between the plates. All the foregoing figures are merely indicative and not limitative, since the calculation of the circuit may safely be left to the discretion of those skilled in the art who will take into account the specific requirements of each individual instance.

It is obvious that many modifications, variations and adaptations may be made by skilled persons without exceeding the scope of the invention. In the claims, the word "polymer" will be used, but the invention is generally applicable to any substance that can be melt-spun.

I claim:

1. Apparatus for spinning synthetic linear polymers from the melt, comprising a tubular melting chamber, means for continuously advancing therethrough, at a predetermined rate, a tubular solid polymer stock having substantially the same cross-section as said melting chamber, a high frequency oscillating electric field comprising two coaxial cylindrical condenser plates constituting the inner and outer bounding surfaces of a section of said melting chamber, for melting said tubular polymer stock in said tubular melting chamber, a closed chamber contiguous to and merging with said melting chamber for collecting the molten polymer, and spinning pumps communicating with said collecting chamber for delivering the molten polymer to spinning nozzles.

2. Apparatus according to claim 1, comprising means for creating a tight seal between the solid polymer stock and the melting chamber.

3. Apparatus according to claim 1, wherein the melting chamber comprises an initial portion having a modified cross-section, whereby to force the tubular polymer stock entering said chamber to undergo a plastic deformation.

4. Apparatus according to claim 1, comprising means for preheating the solid polymer stock before causing the stock to enter the melting chamber.

5. Apparatus according to claim 1, comprising means in addition to the high frequency oscillating electric field for heating the melting chamber thereby facilitating the heating of the solid polymer stock.

6. Apparatus according to claim 1, comprising means for maintaining the walls of the melting chamber at a predetermined temperature.

References Cited in the file of this patent
UNITED STATES PATENTS

| | | |
|---|---|---|
| 2,253,089 | Nydegger | Aug. 19, 1941 |
| 2,253,176 | Graves | Aug. 19, 1941 |
| 2,367,173 | Martin | Jan. 9, 1945 |

FOREIGN PATENTS

| | | |
|---|---|---|
| 682,184 | Great Britain | Nov. 5, 1952 |